Figure 1:
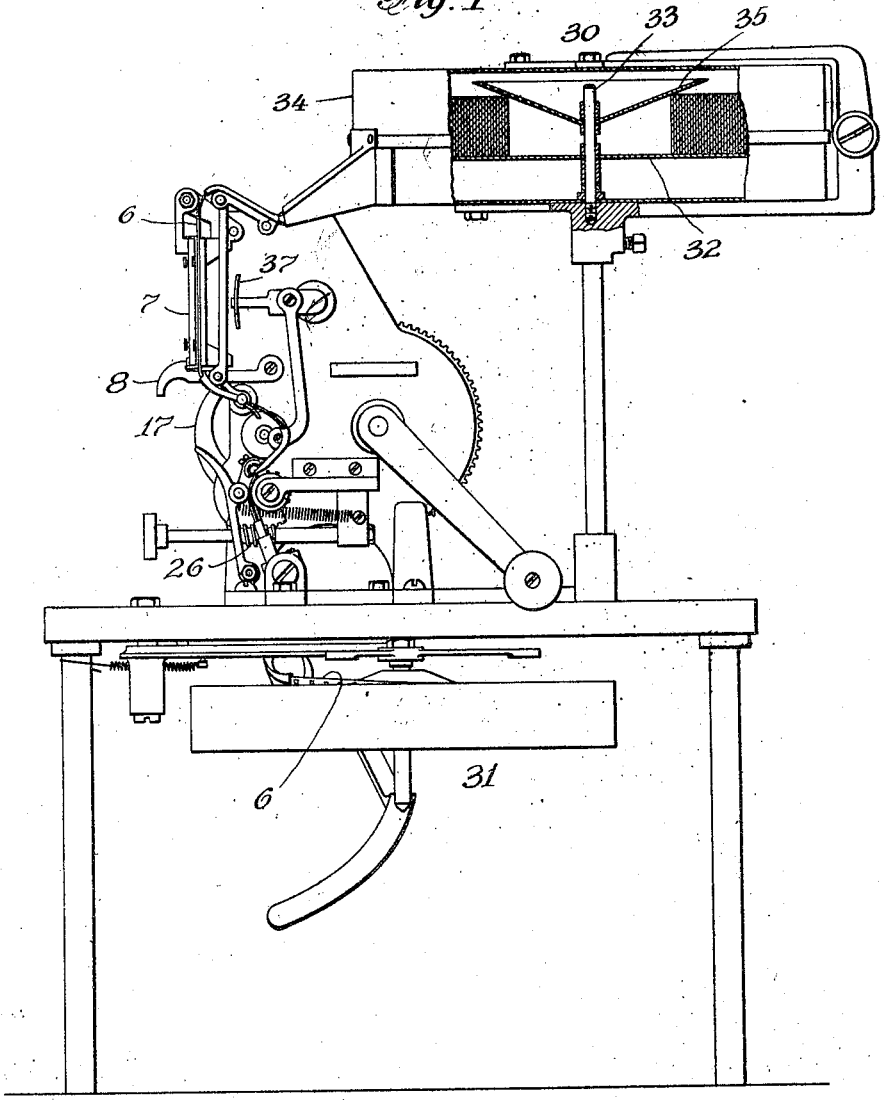

G. W. BINGHAM.
MOVING PICTURE MACHINE.
APPLICATION FILED MAY 11, 1910.

1,052,209.

Patented Feb. 4, 1913.

4 SHEETS—SHEET 4.

WITNESSES
Teresa V. Lynch
Marguerite MacDowell

INVENTOR
George W. Bingham
BY
Brock Beeken & Smith ATTORNEYS.

UNITED STATES PATENT OFFICE.

GEORGE W. BINGHAM, OF BROOKLYN, NEW YORK, ASSIGNOR TO THE BINGHAM MANUFACTURING COMPANY, A CORPORATION OF MAINE.

MOVING-PICTURE MACHINE.

1,052,209.  Specification of Letters Patent.  Patented Feb. 4, 1913.

Application filed May 11, 1910. Serial No. 560,563.

*To all whom it may concern:*

Be it known that I, GEORGE W. BINGHAM, a citizen of the United States, and a resident of the borough of Brooklyn, in the county of Kings and State of New York, have invented certain new and useful Improvements in Moving-Picture Machines, of which the following is a specification.

My invention relates to improvements in moving picture machines, and is an improvement on that particular type of machines wherein the film is intermittently advanced by certain members over which the film is passed (rolls being generally used for this purpose) which are given a reciprocating motion so as to jerk the film down past a point of exposure. These machines, although quite successful, have always possessed a certain disadvantage. The rolls or other film advancing means in use in these prior machines, when reciprocated at the speed necessary in the operation of the machine, acquire a considerable amount of momentum, which, due to the sudden reversals of motion, causes the machine to "pound" and make an objectionable amount of noise and the parts to become worn and loose with respect to each other. This inherent momentum of the film advancing means has heretofore been an obstacle to the operation of a machine of this sort at a very great speed.

To overcome this momentum of the film advancing means and to secure a smooth running and completely efficient machine is one of the objects of the present invention.

Another object of my invention is to simplify the machine as much as possible and to reduce the number of moving parts.

The invention consists broadly in advancing the film by means of a tubular member through which the film is passed and which is given an oscillatory movement so as to intermittently advance the film past the point of exposure. For the purpose of securing this oscillatory movement, the tubular member is preferably supported on a pivot located between the ends of the member, and a cam or like means is preferably utilized for imparting the required movement to the said tubular member. This tubular film advancing member or guide is preferably located below the exposure opening and there may be associated with the said tubular member another guide, located above or in advance of the exposure opening. This second guide is also preferably in the form of a tubular member through which the film is passed, and if desired, this guide may remain relatively stationary. In a preferred form of the invention, however, this upper tubular guide is also oscillated in harmony with the movement of the film advancing tubular guide. In practice there is preferably associated with the film advancing guide, a take-up device such as a sprocket which acts to take up the film as it is advanced by the tubular guide.

It will be understood that the machine of this invention or the various parts thereof may be utilized equally as well in the projector for exhibiting the pictures or in the camera for taking the pictures.

Other features of the invention will appear as the specification proceeds.

In the accompanying drawings there are illustrated several preferred embodiments of my invention but it will be understood that various changes and modifications may be made from the forms shown without departing from the spirit and the scope of the invention.

Figure 2:
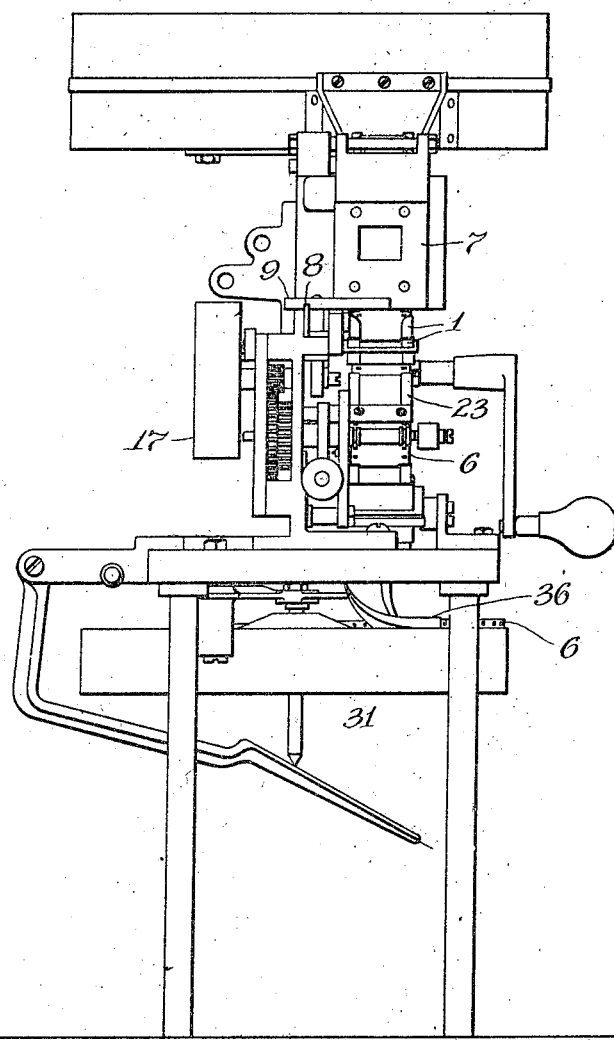
Figure 3:
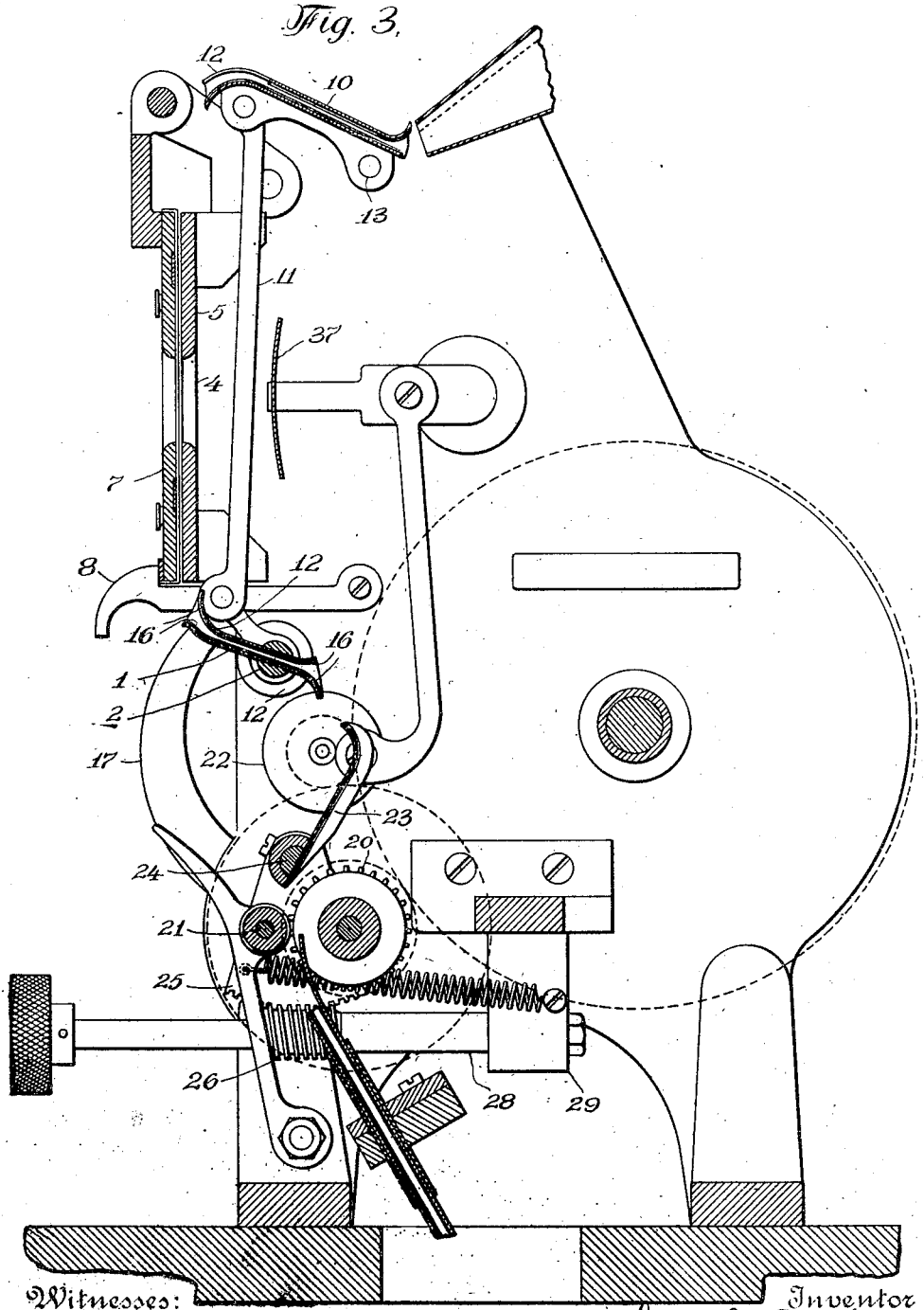
Figure 4:
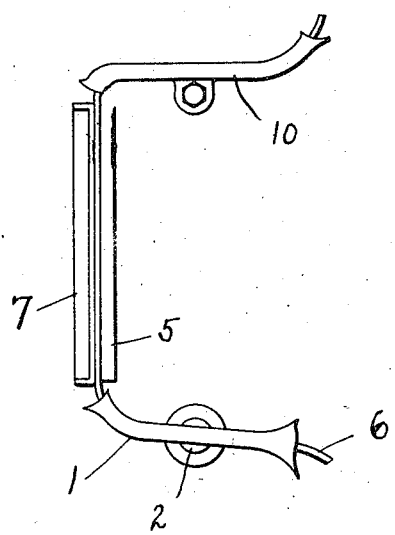
Figure 5:
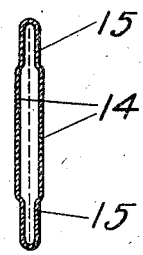
Figure 6:
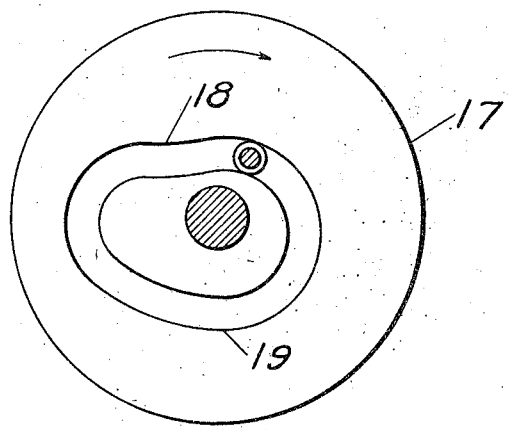

In the drawings: Figure 1 is a side elevation of a machine embodying my invention, the film magazine being shown partly in section. Fig. 2 is a rear end view of the same. Fig. 3 is a longitudinal sectional view on a somewhat enlarged scale, of the invention. Fig. 4 is a detail view of a modified form of the invention, showing only the necessary parts to illustrate the modification. Fig. 5 is a cross sectional view on an enlarged scale of one form of the tubular guide. Fig. 6 is a detail view of the cam for imparting the oscillating motion to the tubular film advancing guide.

Similar reference characters denote corresponding parts throughout the several views.

As was stated in the preamble to the specification, the means for intermittently advancing the film through the machine forms the principal part of this invention and this means consists preferably of a flattened tubular member or guide 1, through which the film is passed and which has imparted thereto an oscillatory motion. This tubular guiding member is preferably mounted so as to oscillate upon a pivotal center 2, which center is preferably located at a point part way between the ends of the member so that said member will partake of a rocking motion. This guiding and film advancing member is supported on the frame 3 of the machine and is located in rear of or below the exposure opening 4. The exposure opening may be, as is usual in such cases, formed in a plate 5, across the face of which plate, the film 6 is fed, the film preferably being held in contact with the face of the plate by means of a door member 7, which may be utilized to exert more or less tension upon the film. This door which thus may be in the nature of a clamp, may be held in normal clamping position by means of a pivoted latch or hook 8. This latch may engage directly with the edge of the door, or, for the purpose of holding the door with a spring tension, the hook may engage a spring arm 9 extending laterally from the lower portion of the door.

Located above the exposure opening or in advance of the same, there is preferably provided a film guide of some sort and this guide preferably consists of a tubular member 10 substantially similar to the film advancing guide. This upper guide may, if desired, remain relatively stationary, substantially as shown in the modified form of the invention illustrated in Fig. 4. Preferably, however, this upper tubular guide partakes of an oscillatory motion substantially similar to the movement of the film advancing tubular guide and for this purpose the two guides may be connected to operate in unison, by means of a connecting link 11. For the purpose of permitting the film to freely pass through the tubular guides, the ends of such guides are preferably curved in a longitudinal direction, substantially as indicated at 12. It will be noted that the mouth or inlet of the film advancing guide is curved upwardly while the exit end thereof is curved downwardly. On the other hand, the upper guide, which may be pivoted to oscillate upon the center 13, preferably has its inlet end directed upwardly so as to receive the film from the film support and its exit end directed downwardly so as to curve the film just before it passes across the face of the plate provided with the exposure opening.

The tubular guide for advancing the film, may, if desired, be made in the form of an open chute having inwardly directed edge portions to engage over the edges of the film (substantially the same in contour as the stationary guide illustrated in a copending application of mine, Serial No. 552,346), or in the form of a complete tube, after the manner shown in the sectional view in Fig. 5 and by this term tubular guide I mean simply a guide of such tubular formation that the film may be passed longitudinally through the same. I prefer the latter form, however, i. e., the guide which is inclosed on all sides, since in this latter form the film is completely inclosed and entirely protected. As will be noticed in the cross-sectional view just referred to, the guide is there made in the form of a flattened tubular member having substantially parallel sides 14, connected by the edge portions 15, these edge portions being narrower or less in width than the central portion of the guide so that in passing through the tubular guide or guides, the film will be contacted only at the edge portions thereof, substantially as indicated in this view. To permit of greater ease in threading the film through the guide or guides, the ends of the guides may be made with somewhat flaring lips as indicated at 16.

It is desirable in a machine of this class that the time required for shifting the film shall be but a small proportion of that time during which the picture is being exhibited, and for this reason it is necessary to give the film advancing member a comparatively quick downward oscillatory movement while the upward or inactive stroke of the film advancing member need not be so rapid. For this reason the tubular film advancing member is preferably oscillated with a comparatively quick downward stroke and with a relatively slow upward stroke. The means for imparting this movement to the tubular film advancing guide may be of any suitable or desired character, but for this purpose I prefer to use a cam 17, having a rather abrupt and almost radially disposed portion 18, for imparting the quick downward movement to the tubular guide, and a gradually rising portion 19, for imparting the relatively slow upward movement to the guide.

In connection with the before described means for imparting the intermittent advancing movement to the film, I preferably employ a take-up device for taking up the used portion of the film as it comes from the lower tubular guide. This film take-up device may consist simply of an ordinary film sprocket 20 associated with which there may be one or more rolls 21 for holding the film in proper engagement with the sprocket.

In the operation of the parts thus far described, during the upward movement of the tubular guides, the upper guide acts to withdraw a certain amount of film from the film support, the film support being for this reason, of such a nature as to permit free withdrawal of the film therefrom. Upon reversal of the direction of movement of the tubular film guides, the lower guide, which is truly the film advancing member, acts to draw down an amount of film past the exposure opening substantially equal to that amount which has just been withdrawn by the upper tubular guide, from the film support. The take-up device is timed so as to wind in the film substantially at such a rate that at the time the tubular film advancing guide is about to commence its downward stroke, the film below the exposure opening is substantially taut so that the film advancing guide will thus act upon a substantially taut piece of film. It will be understood also that this take-up device acts to hold the used portion of the film and to prevent the film from being pulled backward. In order also to prevent the upper tubular guide from drawing the film backward during its upward stroke, I preferably place a light tension upon the film. The door member may be used for the purpose of exerting this tension upon the film, in the manner already described. This tension device may, if found desirable, be entirely dispensed with.

In the case of the modified form of the invention wherein only a stationary guide is provided in advance of the exposure opening, then the film advancing tubular guide acts upon its downward stroke to withdraw the film directly from the film support, instead of, as in the first instance, acting to draw down an amount of film substantially equal to an amount which has just previously been withdrawn from the film support.

When the machine is being used as a projector, some means must be provided for framing the pictures on the film, that is, for bringing the pictures into proper register with the exposure opening. This framing device in the present instance preferably consists of a stationary but relatively adjustable guide over which the film is passed and which is associated with the tubular film advancing member. This framing device may conveniently be, and preferably is, interposed between the tubular film advancing member and the take-up device. This adjustable guide consists preferably, as shown, of a relatively flattened member 22, having upturned confining edges 23, over which the film is passed, after it issues from the tubular film advancing member. This framing member could also be of flat tubular formation, if so desired. For greater ease in threading the film through the machine, however, I prefer to make the framing member with an open side, substantially as shown. The form of adjustment for the framing member may vary, but preferably the said member is provided with a center or pivotal support 24, located near one end thereof and the member is further provided with a dependent rack or segment 25, which is engaged by a worm 26, said worm being adjustable by means of a thumb-piece 27. The bearing for the said worm preferably consists of a bushing 28 which is carried by a part 29 on the framework.

The fresh and used portions of the film may be supported with respect to the machine proper in any suitable manner. For this purpose, however, I preferably employ film handling mechanism which is specifically claimed in other applications filed by me. This film handling mechanism embodies the film support 30 in which the unused portion of the film is carried and the film receiver 31, into which the used portion of the film is wound. Specifically the film support consists preferably of a film supporting disk 32 which is mounted to revolve on a spindle 33 within the casing 34 of the film support. In connection with the film supporting disk I may employ a centering device 35 for centering the coil of film upon the disk. The leading end of the film is fed from the film support down through the machine, from whence, after passing through the take-up device, it is led through a stationary tubular guide 36 which directs the film within the receiver and wherein it is coiled. On account of the ease with which the film is withdrawn from my film support and is again rewound within the receiver with the leading end outward all ready for the next exhibition, I prefer to use this particular film handling mechanism with my machine, but I would have it understood that the machine of this invention is not limited in its use to this particular film handling mechanism, for the machine may be used with any other type of film handling mechanism, such as the customary reels, etc. When reels are used with my machine I may substitute a sprocket in place of the upper guide, it being well known that these reels "wabble" and run more or less unevenly, so that the sprocket in such a case serves to unwind the film from the reel, and the tubular film advancing member simply advances the film as it is unwound by the sprocket. This sprocket is therefore, in a sense, a guide, and the claims are to be construed accordingly.

It will of course be understood that any suitable kind of shutter may be used in the machine. I prefer to employ for this purpose, however, an oscillatory shutter, substantially as indicated at 37, and as specifically claimed in a prior application of mine, Serial No. 428,601.

What is claimed, is:

1. In a moving picture machine provided with an exposure opening, a guiding member for the film located above the exposure opening, a tubular guiding member located below the exposure opening, and means for oscillating said members whereby the film will be intermittently advanced past the exposure opening.

2. In a moving picture machine provided with an exposure opening, a tubular guiding member for the film located above the exposure opening, a tubular guiding member located below the exposure opening, and means for oscillating said members whereby the film will be intermittently advanced past the exposure opening.

3. In a moving picture machine provided with an exposure opening, a guiding member for the film located above the exposure opening, a tubular guiding member located below the exposure opening, means connecting said members to cause them to move in unison, and means for imparting an oscillatory movement to said members.

4. In a moving picture machine provided with an exposure opening, a guiding member for the film located above the exposure opening, a tubular guiding member through which the film is passed located below the exposure opening, and means for oscillating said tubular member with a comparatively slow upward movement and a quick downward movement whereby the film will be intermittently advanced past the exposure opening.

5. In a moving picture machine, film advancing means comprising a tubular member through which the film is passed, and means for oscillating said tubular member whereby the film will be intermittently advanced past a point of exposure.

6. In a moving picture machine, film advancing means comprising a tubular member through which the film is passed, said member being pivotally mounted so as to be capable of an oscillatory movement, and means for oscillating said tubular member whereby the film will be intermittently advanced past a point of exposure.

7. In a moving picture machine, film advancing means comprising an oscillatory tubular member through which the film is passed, and means for oscillating said member with a relatively slow upward movement and a relatively quick downward movement.

8. In a moving picture machine, the combination with a tubular member and means for oscillating said member for the purpose of intermittently advancing the film past the point of exposure, of a take-up device adapted to take up the film so advanced.

9. In a moving picture machine, a take-up sprocket, a tubular member through which the film is passed, located in advance of the sprocket, and means for imparting an oscillatory movement to said tubular member.

10. In a moving picture machine provided with an exposure opening, a guiding member for the film located above the exposure opening, a tubular member through which the film is passed, located below the exposure opening, means for oscillating said tubular member for the purpose of intermittently advancing the film past the exposure opening, and means for taking up the film so advanced.

11. Film advancing mechanism for moving picture machines comprising an upper tubular member through which the film is passed, a lower tubular member through which also the film is passed, and means for oscillating said members, whereby the film will be intermittently advanced past a point of exposure.

12. Film advancing mechanism for moving picture machines comprising an upper tubular member through which the film is passed, a lower tubular member through which also the film is passed, and means for oscillating said members with a comparatively slow upward movement and a relatively quick downward movement.

13. In a moving picture machine, the combination with a film support from which the film may be freely withdrawn, of a tubular member through which the film is passed, and means for oscillating said tubular member, whereby the film will be intermittently advanced past a point of exposure.

14. In a moving picture machine, a tubular guide for the film, pivotally supported at a point between its ends, and means for imparting an oscillatory movement to said guide.

15. In a moving picture machine, tubular guides for the film, said guides being pivotally supported so as to be capable of an oscillatory movement, and means for oscillating said guides so as to impart intermittent advancing movement to the film.

16. In a moving picture machine, an upper pivoted tubular film guide, a lower pivoted tubular film guide, a link connecting said guides, and means for oscillating said tubular guides.

17. In a moving picture machine, the combination with a support from which the film may be freely withdrawn, of upper and lower tubular guides through which the film is passed, and means for oscillating said tubular guides whereby upon the upward movement thereof the upper guide will act to withdraw a certain amount of film from the film support and upon the downward movement of the tubular guides the lower guide will act to draw down an amount of film substantially equal to that amount of film withdrawn from the film support.

18. In a moving picture machine, film advancing means comprising a tubular member through which the film is passed, means for oscillating said tubular member whereby the film will be intermittently advanced past a point of exposure, and means exerting a tension upon the film.

19. Film advancing means for moving picture machines comprising a tubular member having oppositely curved ends, said member being mounted upon a pivotal support, and means for oscillating said member.

20. In a moving picture machine, a tubular member through which the film is passed, having an upwardly curved entrance end and a downwardly curved exit end, said member having the center of pivotal support located between the ends thereof, and means for oscillating said member upon the pivotal support.

21. In a moving picture machine, a continuously rotating take-up member, a tubular member through which the film is passed, located in advance of the take-up member, and means for imparting an oscillatory movement to the tubular member aforesaid.

22. In a moving picture machine provided with an exposure opening, the combination with a support from which the film may be freely withdrawn, of upper and lower tubular guides through which the film is passed, located above and below the exposure opening respectively, and means for oscillating said tubular guides whereby upon the upward movement thereof the upper guide will act to withdraw a certain amount of film from the film support and upon the downward movement of the tubular guides the lower guide will act to draw down an amount of film past the exposure opening substantially equal to that amount of film just previously withdrawn from the film support.

23. In a moving picture machine provided with an exposure opening, the combination with a support for the unused portion of the film, means for withdrawing the film from the said support, and means for intermittently advancing the film so withdrawn from the support past the exposure opening, comprising a member through which the film is passed, said member being pivoted on a center located between its ends so as to be capable of an oscillatory rocking motion, and means for oscillating the said member.

24. In a moving picture machine, film advancing means comprising a tubular member through which the film is passed, means for oscillating said tubular member whereby the film will be intermittently advanced past a point of exposure, and means located in advance of the tubular member for holding the film to prevent retrograde movement of the same.

25. In a moving picture machine, a pivot, a double ended film advancing member mounted at a point between its ends on said pivot, said member having film engaging portions at its opposite ends and a passage for the film intermediate such film engaging portions extending substantially at right angles through the axis of the pivotal support, means for oscillating the member on the pivotal support, whereby the member will advance the film during its stroke in one direction and will hold the film to prevent displacement thereof during its stroke in the opposite direction, and a constantly acting take up device adapted to hold the film and prevent retrograde movement of the same during the advancing stroke of the film advancing member and to take in the film as fast as it is released during the opposite stroke of the film advancing member.

26. In a moving picture machine provided with an exposure opening, a double ended film advancing member located below the exposure opening and pivoted on a center located between its ends, a constantly acting take up device below the film advancing member, and means for oscillating the film advancing member with a quick downward movement, whereby a portion of the film will be quickly moved down past the exposure opening and with a relatively slow upward movement such as to release the film as fast as the take up device takes it substantially in.

27. In a moving picture machine, a film support having an exposure opening therein, a film advancing guide pivoted on a center located between its ends and having its entrance end disposed substantially in line with the film support so as to receive the film directly from said support, means for oscillating the film advancing guide to intermittently advance the film past the exposure opening in the support, and means for holding the film in advance of the film advancing guide to prevent retrograde movement of the same.

28. In a moving picture machine, film advancing means comprising a tubular member pivotally mounted on a center located between its ends and through which the film is passed, the said tubular member having oppositely curved ends which as the member is oscillated engage with the film for the purpose of advancing the same, and the member further having a passage extending between the film-engaging ends aforesaid, means for oscillating the tubular member on its pivotal center whereby upon movement of the member in one direction, the outer film-engaging ends of the member will act to advance the film past a point of exposure and upon the return stroke the intermediate guiding portion will hold the film to prevent displacement thereof, and a constantly acting take-up device adapted to hold the film to prevent retrograde movement of the same during the advancing stroke of the film advancing member and to take in the film substantially as fast as it is released during the return stroke of the film advancing member.

Signed at New York borough of Manhattan in the county of New York and State of New York this 10th day of May A. D. 1910.

GEORGE W. BINGHAM.

Witnesses:
PHILIP S. McLEAN,
LAURA E. SMITH.